(12) United States Patent
Ori et al.

(10) Patent No.: US 7,063,376 B2
(45) Date of Patent: Jun. 20, 2006

(54) STRUCTURAL MEMBER FOR A VEHICLE FRAME ASSEMBLY

(75) Inventors: James C Ori, Troy, MI (US); Saad M Abouzahr, Ann Arbor, MI (US); Shujath I Ali, West Bloomfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/941,386

(22) Filed: Aug. 28, 2001

(65) Prior Publication Data

US 2003/0042759 A1 Mar. 6, 2003

(51) Int. Cl.
*B62D 27/00* (2006.01)

(52) U.S. Cl. .......................... 296/187.01; 296/203.01; 296/29

(58) Field of Classification Search ................ 296/193, 296/195, 203.01, 204, 205, 203.04, 203.03, 296/209, 29, 187.01, 187.03, 187.08, 187.11, 296/193.01, 193.05, 193.07, 193.09; 293/102, 293/132, 133
See application file for complete search history.

(56) References Cited

U.S. PATENT DOCUMENTS

| | | | | |
|---|---|---|---|---|
| 3,901,543 A | * | 8/1975 | Norlin | 293/122 |
| 3,997,207 A | * | 12/1976 | Norlin | 293/110 |
| 4,018,466 A | * | 4/1977 | Norlin | 293/122 |
| 4,159,835 A | | 7/1979 | Leja et al. | 280/756 |
| 4,440,434 A | | 4/1984 | Celli | 296/185 |
| 4,809,999 A | | 3/1989 | Tozawa et al. | 280/281.1 |
| 4,856,833 A | * | 8/1989 | Beekman | 293/120 |
| 5,059,056 A | * | 10/1991 | Banthia et al. | 403/170 |
| 5,114,198 A | * | 5/1992 | Yamashita et al. | 293/120 |
| 5,209,541 A | * | 5/1993 | Janotik | 296/29 |
| 5,219,197 A | * | 6/1993 | Rich et al. | 293/120 |
| 5,397,115 A | * | 3/1995 | Vlahovic | 296/205 |
| 5,458,393 A | * | 10/1995 | Benedyk | 296/205 |
| 5,480,189 A | | 1/1996 | Davies et al. | 280/797 |
| 5,681,057 A | | 10/1997 | Whirley et al. | 280/784 |
| 5,800,003 A | | 9/1998 | Clenet | 296/29 |
| 5,941,597 A | * | 8/1999 | Horiuchi et al. | 296/203.01 |
| 6,010,182 A | * | 1/2000 | Townsend | 296/203.01 |
| 6,047,988 A | | 4/2000 | Aloe et al. | 280/788 |
| 6,082,926 A | | 7/2000 | Zimmer | 404/6 |
| 6,165,588 A | * | 12/2000 | Wycech | 296/188 |
| 6,168,226 B1 | * | 1/2001 | Wycech | 296/146.6 |
| 6,203,098 B1 | * | 3/2001 | Motozawa et al. | 296/189 |
| 6,241,310 B1 | * | 6/2001 | Patelczyk | 296/205 |
| 6,267,436 B1 | * | 7/2001 | Takahara | 296/187.05 |
| 6,296,301 B1 | * | 10/2001 | Schroeder et al. | 296/188 |
| 6,328,377 B1 | * | 12/2001 | Makita et al. | 296/205 |
| 6,360,441 B1 | * | 3/2002 | Himsl et al. | 29/897.2 |
| 6,382,709 B1 | * | 5/2002 | Chirifu et al. | 296/189 |
| 6,402,414 B1 | * | 6/2002 | Kanodia et al. | 403/230 |
| 6,406,078 B1 | * | 6/2002 | Wycech | 293/120 |
| 6,467,834 B1 | * | 10/2002 | Barz et al. | 296/187 |

(Continued)

FOREIGN PATENT DOCUMENTS

DE 19858903 * 6/2000

*Primary Examiner*—H Gutman
(74) *Attorney, Agent, or Firm*—Ralph E. Smith

(57) ABSTRACT

A structural member for a motor vehicle, that is selectively positioned inside of a tubular frame rail that operatively deforms to absorb and dissipate energy in the event of a collision. The structural member having a tubular body with strengthening ribs located inside of the tubular body.

17 Claims, 5 Drawing Sheets

U.S. PATENT DOCUMENTS

| | | | |
|---|---|---|---|
| 6,470,990 B1 * | 10/2002 | Panoz | 180/311 |
| 6,474,723 B1 * | 11/2002 | Czaplicki et al. | 296/187.02 |
| 6,478,367 B1 * | 11/2002 | Ishikawa | 296/203.03 |
| 6,494,525 B1 * | 12/2002 | Blank | 296/187.02 |
| 6,668,457 B1 * | 12/2003 | Czaplicki | 29/897.1 |
| 6,746,061 B1 * | 6/2004 | Evans | 293/120 |
| 6,866,331 B1 * | 3/2005 | Kropfeld | 296/187.02 |
| 6,896,320 B1 * | 5/2005 | Kropfeld | 296/203.01 |
| 2002/0027379 A1 * | 3/2002 | Czaplicki | 296/188 |
| 2004/0262931 A1 * | 12/2004 | Roussel et al. | 293/120 |

* cited by examiner

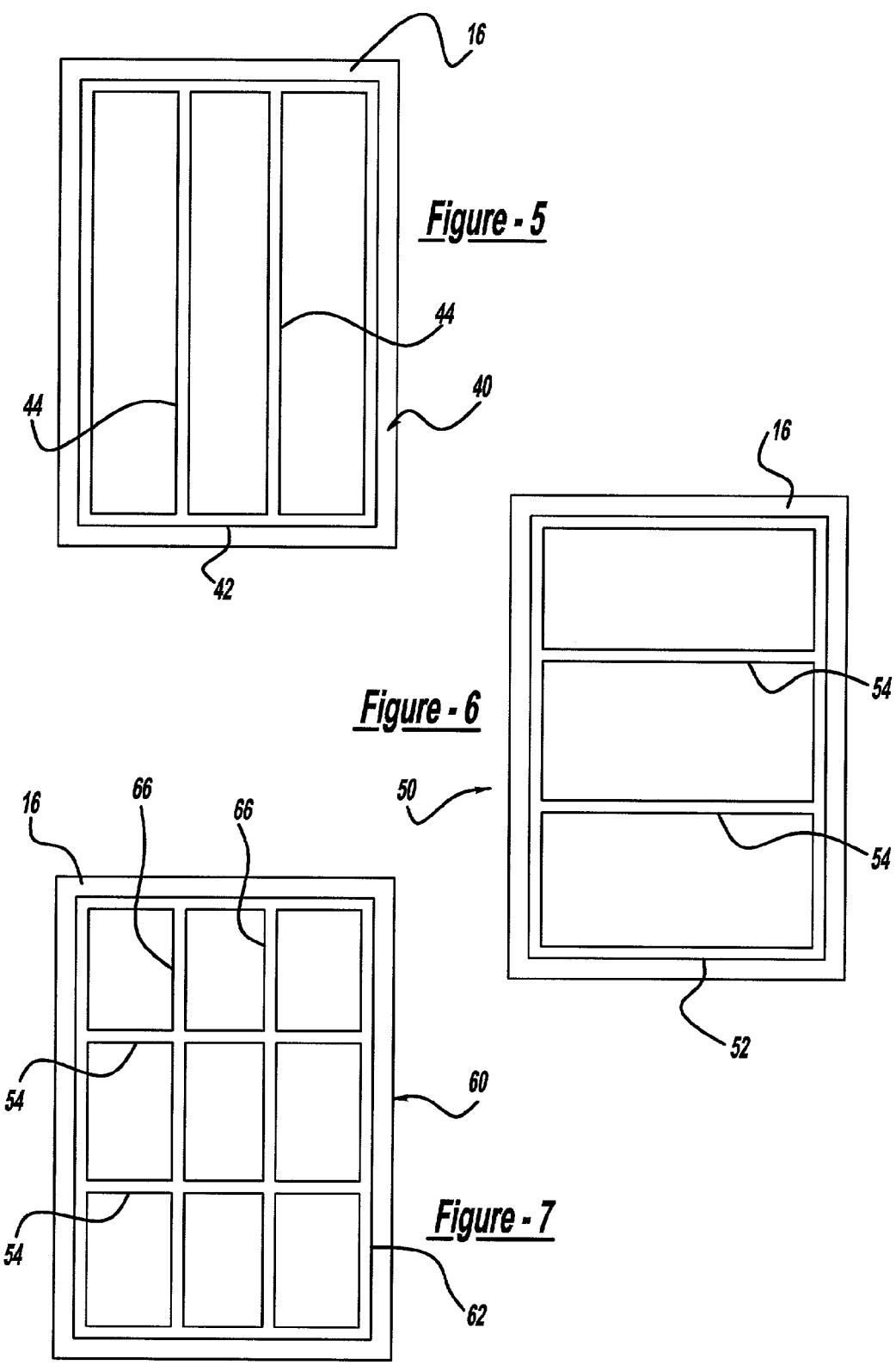

STRUCTURAL MEMBER FOR A VEHICLE FRAME ASSEMBLY

FIELD OF THE INVENTION

The present invention relates generally to a frame assembly for a motor vehicle. More particularly, the present invention relates to a structural member located inside the tubular frame members of a motor vehicle for operatively increasing the crashworthiness of the vehicle.

BACKGROUND OF THE INVENTION

It is known to construct frames for vehicles such as automotive vehicles defining the general shape of the automotive vehicle and for supporting its various load-bearing functional components from members fabricated in a variety of manners. In the interest of enhancing fuel economy of automotive vehicles, great attention has been given to fabricating structural members having reduced weight. Conversely, a competing interest in the design of the vehicle frame is the ability to withstand the effects of a vehicle collision.

It is also known that vehicle frames include forward, rear and middle portions. Generally, the forward and rear portions are designed to, among other things, absorb and dissipate the energy of a collision through deformation in order to protect the middle portion, the passenger compartment, of the vehicle. Typically the forward and rear portions include longitudinally oriented tubular frame rails which deform during a collision. When the vehicle is impacted directly from the front or rear, the frame rails deform axially through compaction. However, when impacted at an angle, the frame rails may buckle or bend, dramatically reducing the energy absorbed.

Another factor associated with buckling or bending of frame rails is vehicle frame geometry. In most vehicles, the frame rails are attached to structural members or braces to increase the rigidity of the vehicle frame. In some configurations structural members are attached to frame rails at points other than the ends (for styling purposes) resulting in a portion of the frame rail being cantilevered from the remainder of the rigid frame assembly. In this configuration, a collision may cause buckling or bending at the attachment or joint of the frame rail to the structural member resulting from weld hardening or increased rigidity of the frame assembly.

While many attempts have been made to design lightweight crashworthy vehicle structures that selectively dissipate energy from a crash to prevent injury of the passengers, it remains desirable to provide a frame member for selectively increasing the strength and reducing the buckling and bending of the vehicle structure at points without substantially increasing the weight of the vehicle.

SUMMARY OF THE INVENTION

It is a general object of the present invention to provide a device for increasing the strength and reducing the bending of vehicular frame members.

In one form, the present invention provides a device disposed in a tubular frame rail of a vehicle, the apparatus having a generally tubular body with a perimeter substantially similar to the perimeter of the frame rail and a plurality of ribs disposed within the tubular body of the device.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 5 is a cross section view of a second preferred embodiment of the present invention;

FIG. 6 is a cross section view of a third preferred embodiment of the present invention;

FIG. 7 is a cross section view of a fourth preferred embodiment of the present invention;

DETAILED DESCRIPTION OF THE PREFERRED EMBODIMENT

The following description of the preferred embodiments is merely exemplary in nature and is in no way intended to limit the invention, its application, or uses.

Figure 1:
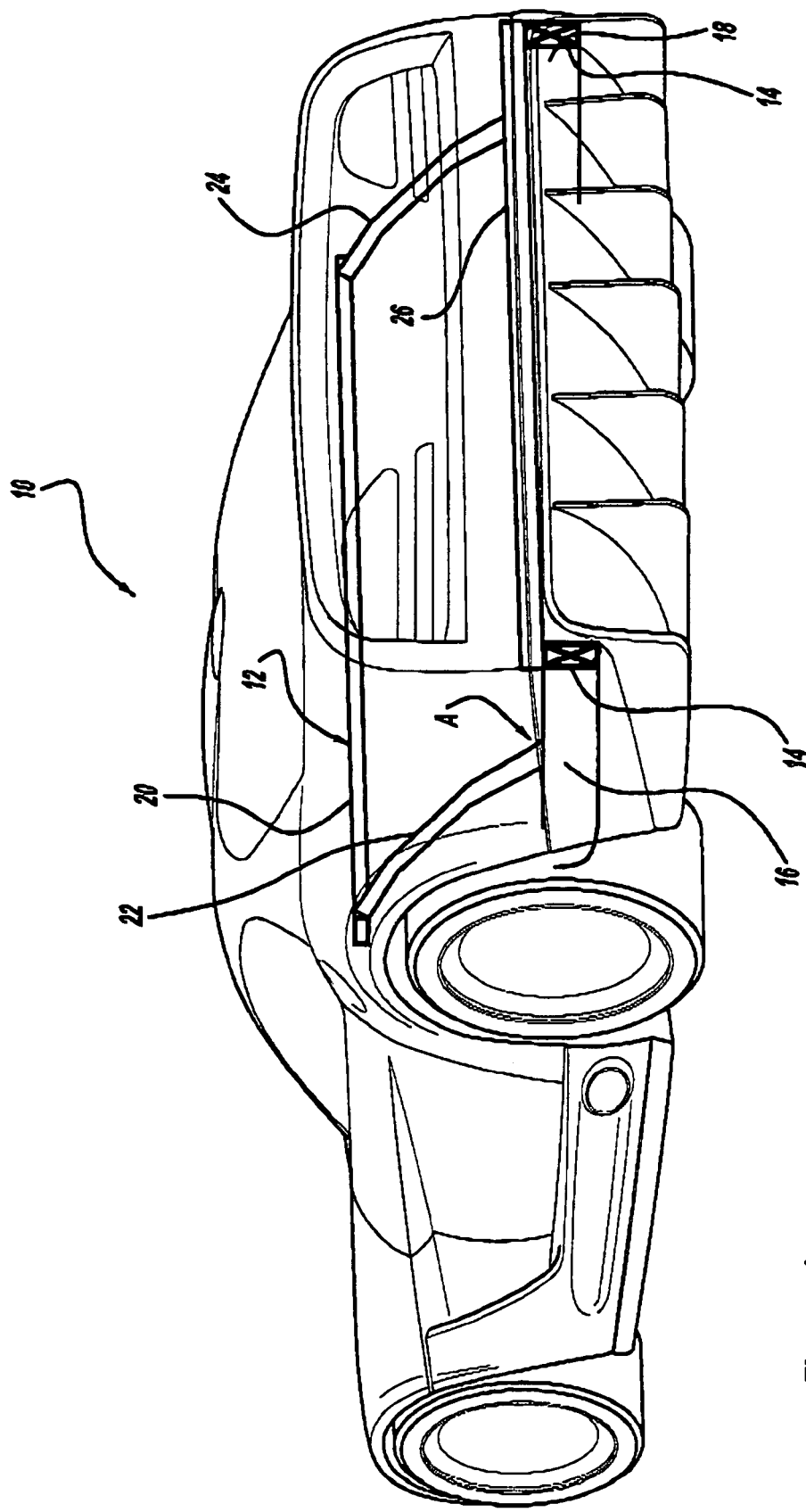
FIG. 1 is a perspective view of an exemplary vehicle including the structural member of the present invention shown in bold.

Referring now to the drawings in greater detail, FIG. 1 illustrates an automotive vehicle of the type having a body over frame construction. As used herein, the term left side pertains to elements located on the driver's side of the vehicle and the term right side pertains to elements located on the passenger's side of the vehicle. Automotive vehicle 10 includes a tubular frame assembly for supporting automotive components, providing a structure to which the body is attached and providing overall vehicle rigidity. The frame assembly includes three sub-sections, a front section, a middle section and a rear section 12 (shown in bold).

In the event of a crash, the function of each of the sub-sections of the frame assembly is different. The middle section, passenger compartment, of the vehicle is preferably constructed to resist deformation and retain its shape in order to protect occupants. The front and rear sections are designed to absorb the energy of the crash. As shown in FIG. 1, vehicle 10 includes a rear frame section denoted by numeral 12 having a structural member 14 disposed therein for increasing frame strength and stiffness (i.e., preventing undesired deformation).

Figure 2:
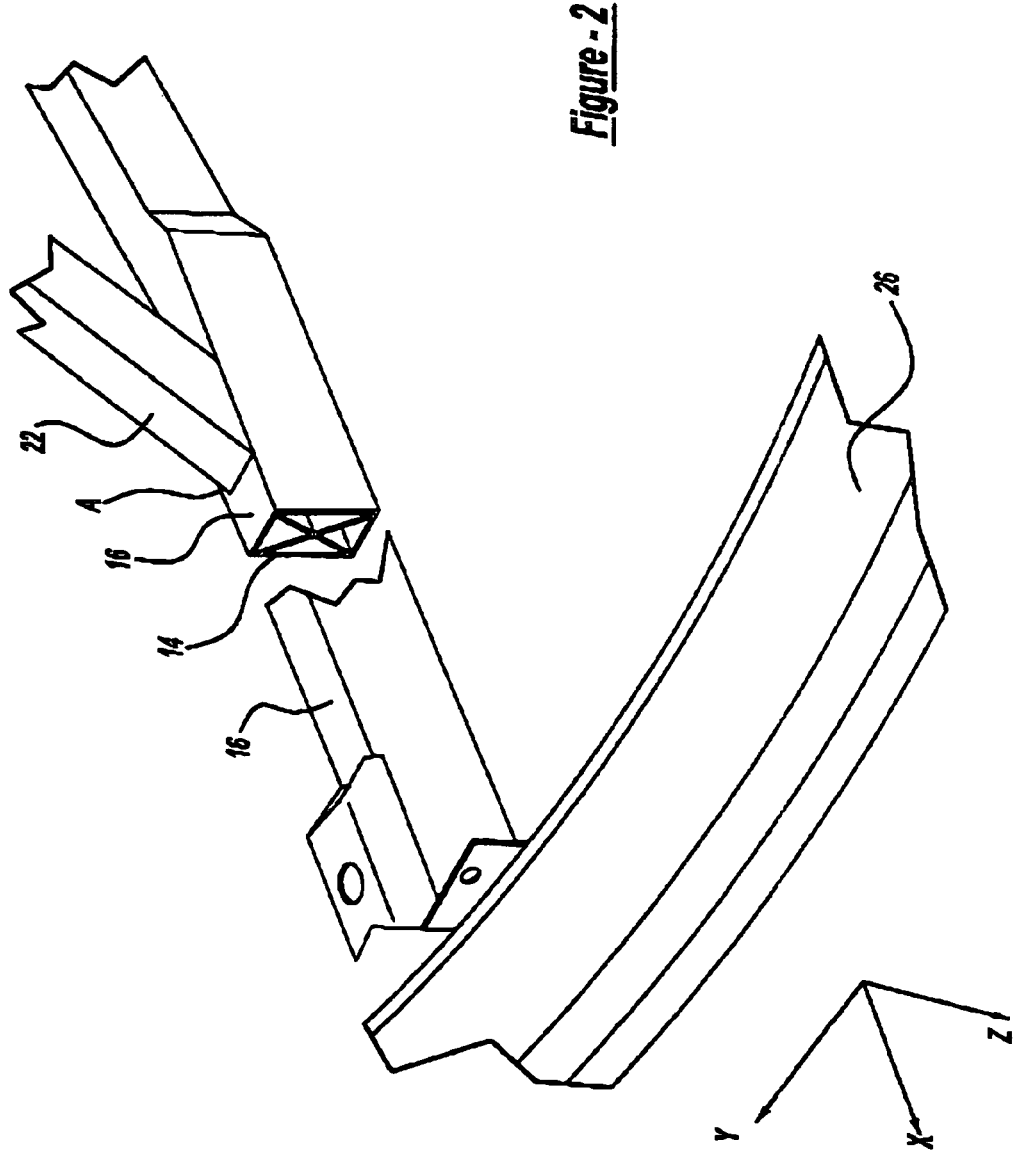
FIG. 2 is a partial view of a vehicle rear frame structure including the structural member of the present invention.
Figure 3:
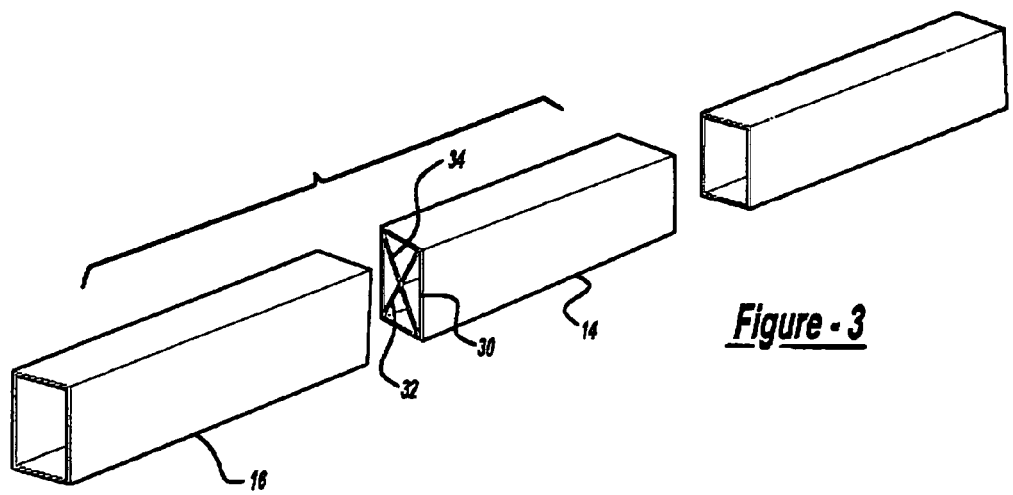
FIG. 3 is an exploded perspective view of the lower rail and the structured member.
Figure 4:
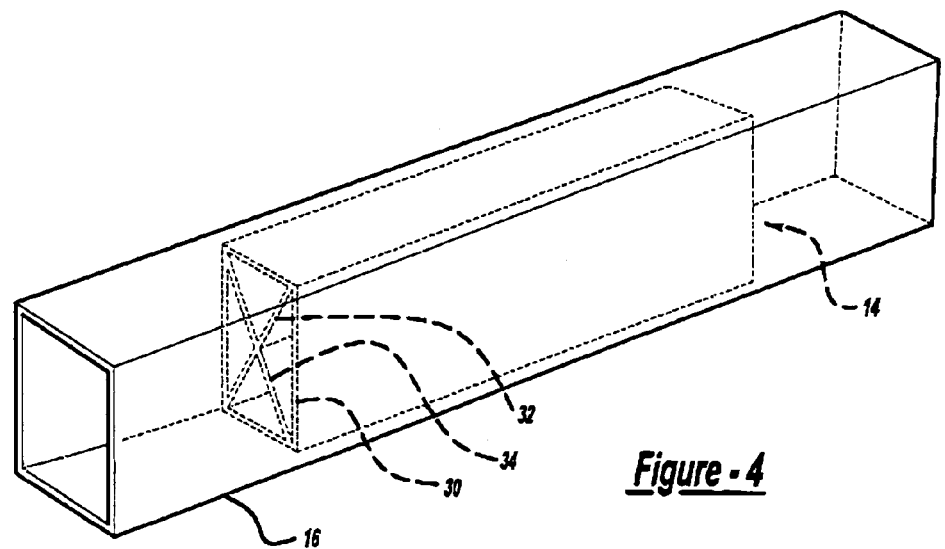
FIG. 4 is a perspective view of the lower rail and the structured member in an assembled condition.

Rear frame section 12 is comprised of longitudinally oriented left rear lower rail 16, longitudinally oriented tight rear lower rail 18, cross car support 20 and left and right upper rails 22 and 24, connecting left and light rear lower rails 16 and 18 to cross-car support 20, respectively. Left upper rail 22 and right upper rail 24 angle generally downward and rearward from cross-car support 20 and connect to lower rails 16, 18, thus triangulating the rear section 12 to achieve the desired stiffness while optimizing the mass of the vehicle frame. As shown in FIG. 2, left upper rail 22 connects to left rear lower rail 16 at point A, located generally at the middle of rear lower rail 16.

In the event of a collision, energy from the collision is transferred from the bumper 26 to rear lower rails 16, 18. For simplicity, the performance of left lower rail 16 will be discussed. As mentioned above, rear lower rail 16 is attached to the middle section of the vehicle at one end typically a rear torque bearing member such as a torque box and to upper rail 22 at point A. If the load of the collision acts along its longitudinal axis, rail 16 dissipates the energy from the collision through compression by compacting the tubular frame rail axially onto itself. If the energy from the collision is not totally dissipated by axial deformation or the impact is non-axial, lower rail 16, as discussed above, may bend about a hinge point, typically at joint A. Bending of lower rail 16 is undesirable for several reasons. First, bending of a tubular element does not dissipate as much energy as an axial collapse deformation. Therefore, more energy is transferred to the middle section of the vehicle, acting on the occupants. Second, the bending of the rear frame rail may result in unpredictable deformation of the vehicle frame causing the frame members or other components to come in unwanted contact with other components.

In the exemplary vehicle of FIGS. 1 and 2, bending of the lower rail 16 would typically occur at connection point A as described above. Connection point A and triangulation of lower rail 16 and upper rail 22 represents a corner of a substantially rigid structure relative to lower rail 16 extending rearwardly therefrom. Lower rail 16 extends generally rearward from connection point A. This configuration may cause the extended portion of rear lower frame rail 16 to be more susceptible to bending.

Noting the possible issues with the rear lower rails not fully dissipating energy and the unwanted effects of bending, it is advantageous to provide a frame element that promotes axial deformation of the rear lower frame rails and prevent bending.

In the present invention, structural member 14 is disposed within the lower rails 16, 18 to prevent bending and increase the amount of energy required to deform the frame rails axially. Structural member 14 is defined by a tubular main body portion 30 having a perimeter complimentary to the interior perimeter of frame rail 16. Additionally, structural member 14 includes two ribs 32,34 diagonally located within the main body portion for operatively increasing the structural deformation characteristics of member 14.

In the event of a rear-on collision, structural member 14 substantially increases the amount of energy that is required to compact the rear frame rail. The inclusion of the structural member 14 locally increases the wall thickness of the rear frame rail, whereby the frame rail absorbs more energy then without structured member 14. The selective placement of structural member 14 allows for precise control of energy absorption and dissipation during deformations both axial and non-axial.

The second advantage of the present invention is the local increase in bending stiffness of the frame rail. Thus, the inclusion of structural member 14, as stated above, increases the amount of energy that can be absorbed during bending of lower rail 16. Structural member 14 increases the amount of energy that can be absorbed by increasing the amount of material that must be deformed.

Ribs 32, 34 of structural member 14 further increases the strength of the frame rails. The ribs 32,34, like the tubular main body portion 30 of the structural member 14 increase the amount of material that must be deformed, thereby increasing locally strength of the assembly. The orientation of the ribs may be constructed in the tubular body as to increase the strength of the assembly in a certain bending plane. For example, diagonally oriented ribs 32, 34 dramatically increase the amount of energy that can be absorbed if the frame members were bent about a vertical axis (z) or a transverse axis (y).

FIGS. 5–7 represent additional embodiments of the present invention. In FIG. 5 a second preferred embodiment of the present invention, structural member 40, is shown. Structural member 40 is comprised of a generally rectangular body 42 and a pair of vertical support ribs 44. Vertical support ribs 44 are disposed inside rectangular body 42 and connect a first side of generally rectangular body to a second side of the generally rectangular body located opposite of the first side. Thus, ribs 44 significantly increase the movement of inertia and thus the bending stiffness about the transverse axis (y) without significantly increasing the movement of inertia about the vertical (z) axis.

As shown in FIG. 6, a third preferred embodiment of the present invention, structural member 50, is shown. Structural member 50 is comprised of a generally rectangular body 52 and horizontal support ribs 54. Horizontal support ribs 54 are disposed inside rectangular body 52 and connect a first side of generally rectangular body to a second side of the generally rectangular body located opposite of die first side. Thus, ribs 54 significantly increase the movement of inertia and thus the bending stiffness of about the vertical (z) axis without significantly increasing the movement of inertia about the transverse (y) axis.

FIG. 7 illuminates a fourth preferred embodiment of the present invention, structural member 60. Structural member 60 is comprised of a generally rectangular body 62, horizontal support ribs 64, and vertical support ribs 66. Ribs 64 and 66 are disposed inside rectangular body 62 and connect a side of generally rectangular body to another side of the generally rectangular body located opposite of the first side to form a series of intersecting ribs. Thus, ribs 62, 64 (similar to ribs 32,34), significantly increase the movement of inertia and the bending stiffness about both the vertical (z) and transverse (y) axes.

As shown in FIGS. 3–7, the present invention may be constructed using several different geometrical structures. It is understood that the present invention may embody other geometric shapes as required by a specific application of the present invention without departing from the spirit and scope thereof.

It is preferred that the invention in the present application be manufactured by extrusion. It is also understood that the present invention may be constructed by use of machining. The use of machining, also allows the present invention to be constructed having varying cross sections.

It is also preferred that the present invention be constructed of aluminum to minimize the weight increase of adding a member to the frame assembly. However, it is also conceivable that the present invention be constructed of steel, or suitable plastic materials.

In a preferred method, the present invention is secured within a tubular frame member by use of external fasteners. It is also understood that the present invention may be secured in a tubular frame member by use of adhesives, interference fit, and external depressions (48. See FIG. 5).

The present invention, as described above, operatively increases the amount of energy that is absorbed by the rear frame assembly and reduces the bending of the frame rail about an attachment point. It is also understood that the present invention may be used in tubular frame members to increase flexural stiffness, increase impact toughness and increase torsional rigidity without departing from the scope of the invention.

Figure 8:
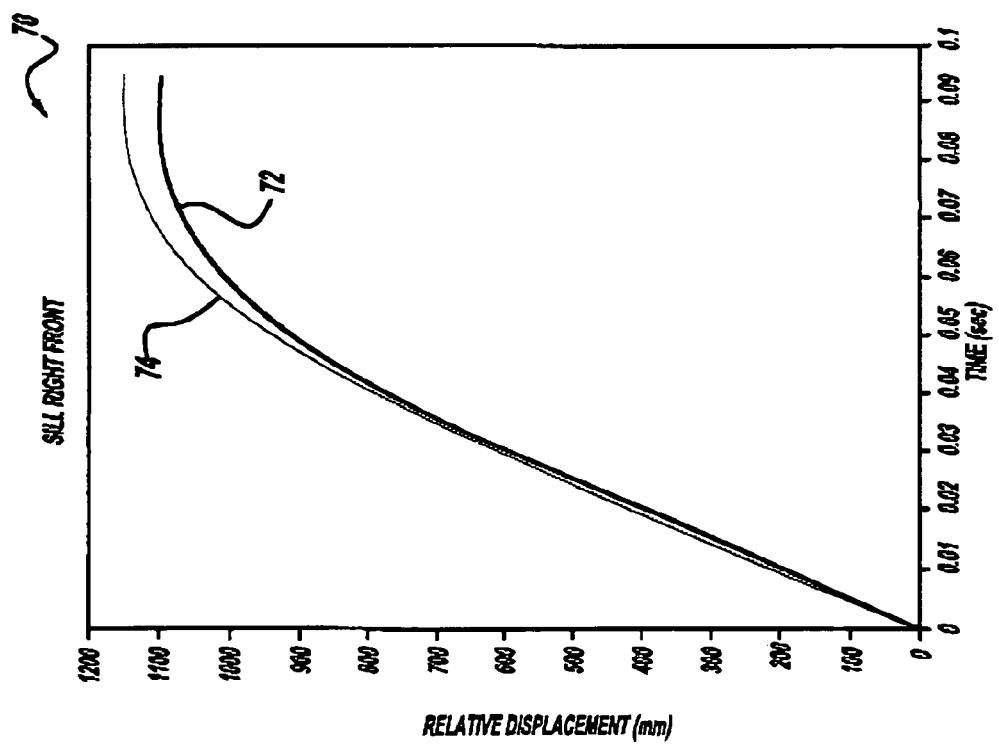
FIG. 8 is a chart of the relative displacement of the sill and the barrier with respect to time during a vehicle crash.

With reference to FIG. 8, a graph 70 showing the relative displacement of a vehicle sill (vertical axis) with respect to time (horizontal axis) is shown. In vehicle impact testing, a vehicle is impacted with a barrier to approximate a vehicle to vehicle collision. The graph in FIG. 8 illustrates the displacement of the rear sill of an exemplary vehicle after impact with a barrier at 50 mph. The bold line 72 indicates the relative displacement, when the rear frame includes the structural member of the present invention. The second line 74 indicates the relative displacement, of the standard rear frame (i.e. without structural member 14). As shown, the inclusion of structural member 14 of the present invention results in a significant reduction in relative displacement of the sill in rear-on collisions.

Figure 9:
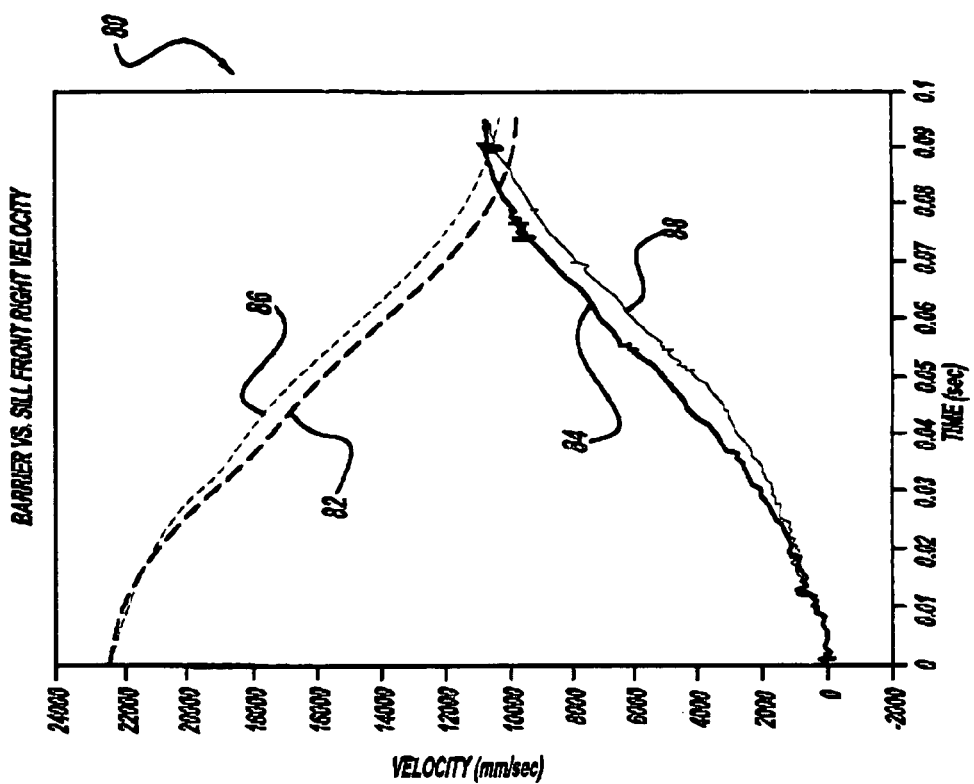
FIG. 9 is a chart of the relative velocities of the sill and the barrier with respect to time during a vehicle crash.

With reference to FIG. 9, a graph 80 showing the velocity of the barrier and the exemplary vehicle are shown after the impact test described above. As shown, the velocity of the vehicle with respect to the barrier (shown in dashed lines) is initially at about 50 mph. When the vehicle impacts the barrier (t =0.0), the velocity of the vehicle (shown in dashed lines 82, 86) begins to decrease and the velocity of the barrier (shown in said lines 84, 88) begins to increase. Shown in bold lines 82,84 are the velocity curves of the barrier and the vehicle having structural member of the present invention included. As illustrated, the inclusion of the structural member 14 of the present invention allows the energy of the collision to be absorbed in less time than the vehicle not having the structural member 14. Therefore, it is shown that the structural member 14 allows the vehicle frame to more effectively absorb the energy of the crash without significantly altering the velocity profile associated with the collision.

The description of the invention is merely exemplary in nature and, thus, variations that do not depart from the spirit and scope of the invention.

What is claimed is:

1. A motor vehicle frame assembly having a first tubular frame member, and a structural member disposed in the first tubular frame member, the structural member comprising:
   a generally tubular rigid body having an outer perimeter parallel to and in abutting engagement with an inner perimeter of the first tubular frame member, the tubular body being disposed within the first tubular frame member to increase the moment of inertia of the first tubular frame member; and
   at least one rib disposed in and spanning an interior void of, and in abutting engagement with, the tubular rigid body;
   wherein the frame assembly further includes a second tubular frame member intersecting the first tubular frame member to form a joint and the structural member is located in the first tubular frame member at the joint.

2. The motor vehicle frame assembly of claim 1, wherein the structural member is constructed of aluminum.

3. The motor vehicle frame assembly of claim 1, wherein the structural member is constructed of steel.

4. The motor vehicle frame assembly of claim 1, wherein the structural member is extruded.

5. The motor vehicle frame assembly of claim 1, wherein the structural member is machined.

6. The motor vehicle frame assembly of claim 1, wherein the structural member is fixedly attached to the first tubular frame member.

7. The motor vehicle frame assembly of claim 6, wherein the structural member is fixedly attached by an interference fit.

8. The motor vehicle frame assembly of claim 6, wherein the structural member is fixedly attached by adhesive.

9. The motor vehicle frame assembly of claim 6, wherein the structural member is fixedly attached by fasteners.

10. The motor vehicle frame assembly of claim 6, wherein the structural member is fixedly attached by external depressions.

11. The motor vehicle frame assembly of claim 1, wherein the tubular body has a length and the rib extends the length of the tubular body.

12. The motor vehicle frame assembly of claim 1, wherein the rib is orientated generally vertically.

13. The motor vehicle frame assembly of claim 1, wherein the at least one rib comprises multiple ribs orientated in an intersecting pattern.

14. A motor vehicle frame assembly having first and second elongate frame members and a reinforcing member, the reinforcing member comprising:
   a rigid tube having an outer perimeter substantially mating and in abutting engagement with an inner perimeter of a tubular portion of the first frame member and a reinforcement structure spanning an interior void of, and in abutting engagement with, the rigid tube; and
   wherein the first and second frame members are connected at a joint and the reinforcing member is disposed in the first frame member at the joint.

15. The motor vehicle frame assembly of claim 14, wherein the reinforcement structure comprises a longitudinal rib.

16. The motor vehicle frame assembly of claim 14, wherein the second frame member is tubular and the joint occurs at a central portion of the first frame member, the reinforcing member extending within the first frame member through the joint.

17. The motor vehicle frame assembly of claim 14, wherein the reinforcing member is fully enclosed by the first frame member.

* * * * *